Oct. 22, 1963   R. C. WEIDENBACH   3,107,646
SPILLWAY GATE POSITION INDICATOR
Filed Sept. 27, 1961   3 Sheets-Sheet 1

INVENTOR.
RAY C. WEIDENBACH
BY Lothrop & West
ATTORNEYS

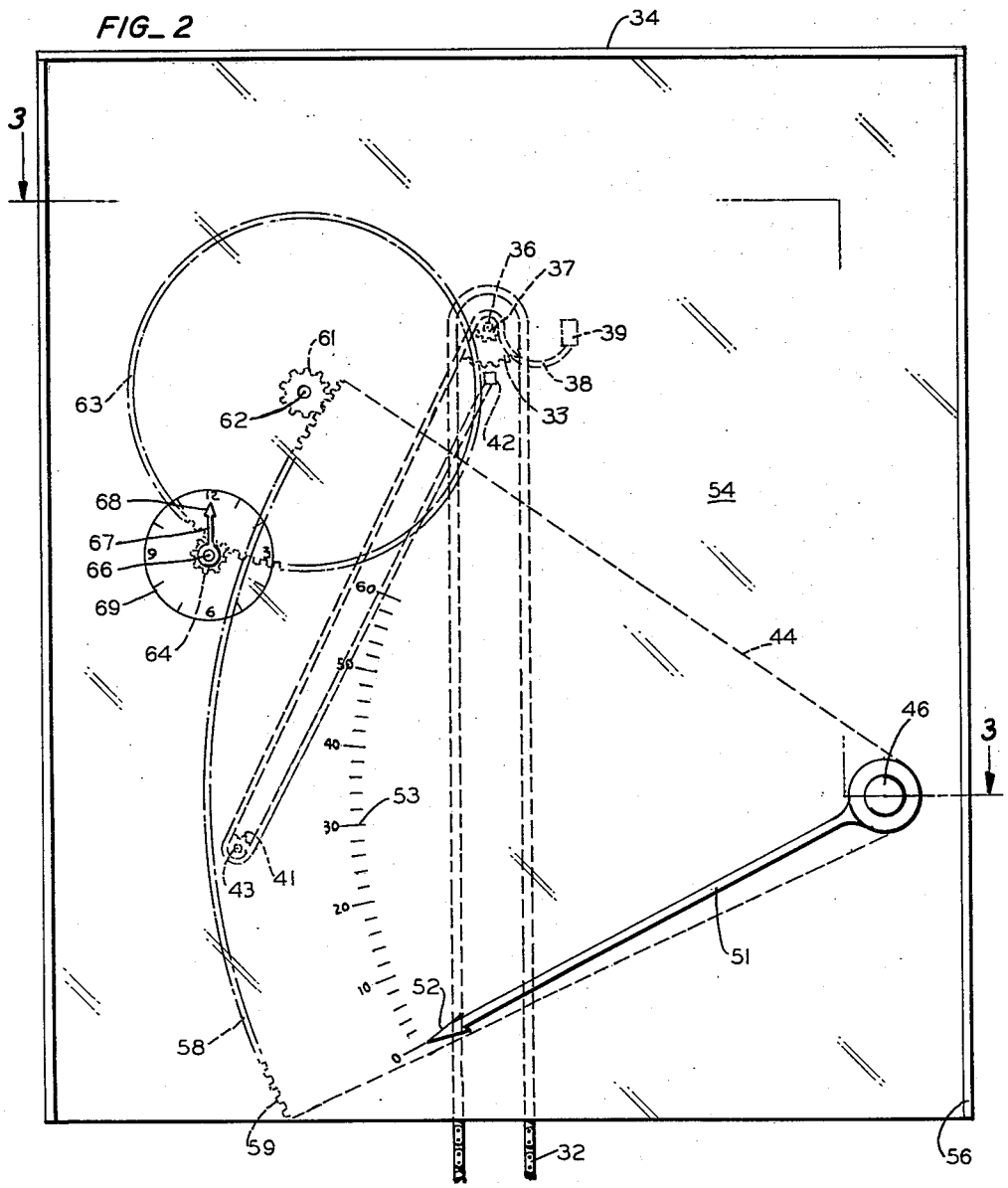

Oct. 22, 1963 R. C. WEIDENBACH 3,107,646
SPILLWAY GATE POSITION INDICATOR
Filed Sept. 27, 1961 3 Sheets-Sheet 3
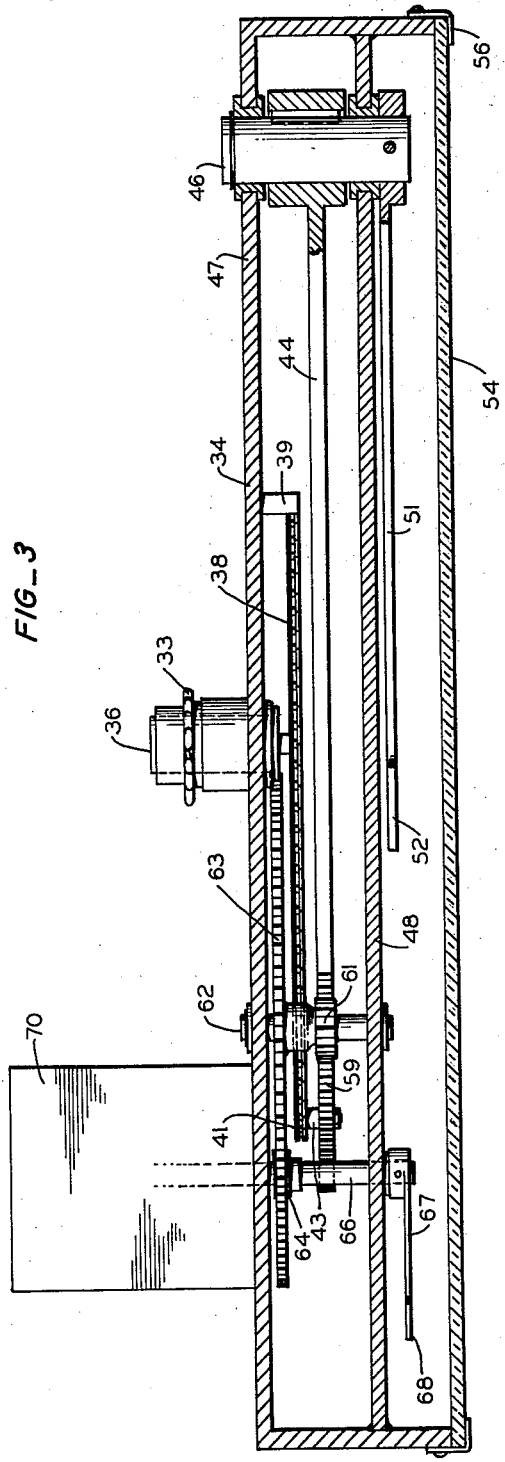
FIG_3
INVENTOR.
RAY C. WEIDENBACH
BY *Lothrop & West*
ATTORNEYS

United States Patent Office 3,107,646
Patented Oct. 22, 1963

3,107,646
SPILLWAY GATE POSITION INDICATOR
Ray C. Weidenbach, Napa, Calif., assignor to Yuba Consolidated Industries, Inc., a corporation
Filed Sept. 27, 1961, Ser. No. 141,101
7 Claims. (Cl. 116—124)

My invention relates to means primarily, although not exclusively, useful in connection with waterworks such as the spillway mechanism of a hydraulic dam. In many such installations the flow of water over an outlet weir is regulated or controlled by a spillway gate movable into different positions so that the quantity of water flowing can be carefully regulated. Many spillway gates operate vertically, but others are generally arcuate in contour and swing in an up-and-down direction about a central axis, so that the gate motion is a swinging, rising and falling movement. It is important to know the precise gate position with respect to the subjacent weir, so that the quantity of water flowing can be carefully judged. This is often difficult because the gate is in a somewhat obscured location and furthermore the flowing water makes it impracticable by any direct visual means to determine the precise gate lip position.

It is therefore an object of my invention to provide a gate position indicator of considerable accuracy and adapted to be installed where it can be readily read.

Another object of the invention is to provide a spillway gate indicator which is simple and rugged, to withstand outdoor exposure.

Another object of the invention is to provide a spillway gate indicator effective not only to give a general, or coarse, indication of the spillway gate position, but also to give a quite accurate, or fine, indication of the spillway gate position.

Another object of the invention is to provide a spillway gate indicator which readily can be applied to a spillway gate without disrupting the normal mechanism thereof and without interfering with the surrounding structure.

Other objects, together with the foregoing, are attained in the embodiment of the invention described in the accompanying description and illustrated in the accompanying drawings, in which:

FIGURE 2 is an enlarged view showing the obverse face of an indicator housing with some of the indicating mechanism in elevation and other of the indicating mechanism in dotted lines.

FIGURE 3 is a cross section on two different planes indicated by line 3—3 of FIGURE 2.

Figure 1:
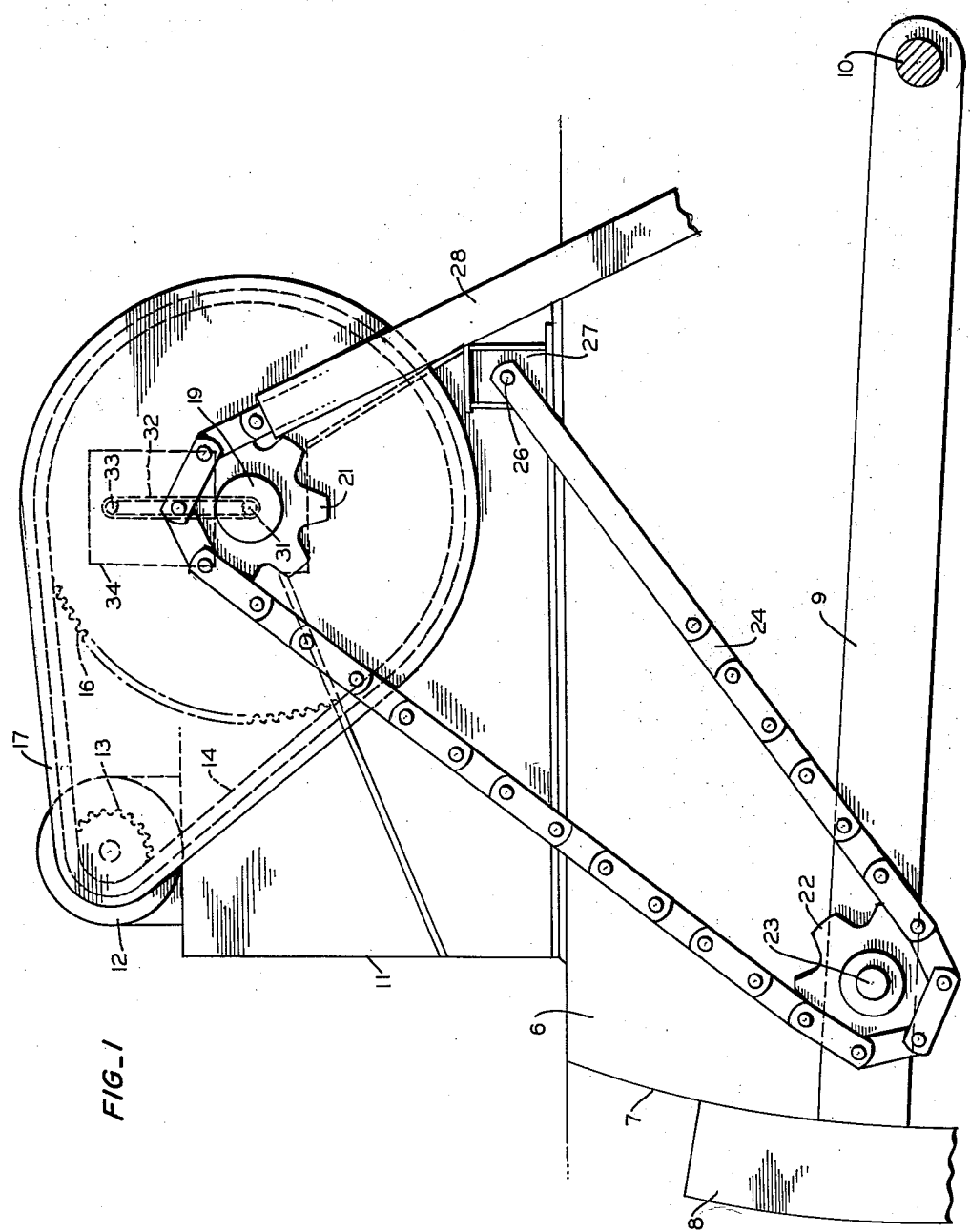
FIGURE 1 is a diagram, mostly in side elevation, showing schematically a closed spillway gate in its normal environment with the usual actuating mechanism connected thereto and with the indicator of the invention installed.

While the spillway gate indicator pursuant to the invention can be varied in a number of different ways, depending upon the particular installation in which it is to be incorporated, it has successfully been embodied in the form generally shown herein. In this case a hydraulic dam 6 has a spillway frame 7 on which an arcuate spillway gate 8 operates. A radial arm 9, representing any number of similar arms, is fast to the gate 8 and is connected to the dam or frame 7 by means of a pivot shaft 10.

Since the gate 8 is customarily of quite large size, it is moved by electrical power. For that reason, there is disposed on the dam 6 to one side of the gate mechanism a suitable mounting 11 carrying an electric motor 12. A drive sprocket 13 is situated on the shaft of the motor 12 and is in engagement with a drive chain 14 also encompassing a driven sprocket 16. In some cases the sprockets and chain are replaced by gears. The drive is enclosed within a suitable housing 17. The sprocket 16 is fast on a large drive shaft 19 which carries a chain drive sprocket 21 fast thereon and so rotating with the rotation of the electric motor 12. In alignment with the drive sprocket 21 is a similar gate sprocket 22 journaled on a stub shaft 23 projecting from the gate arm 9. A link chain 24 is at one end connected by a pin 26 to a fastening block 27 firmly fixed on the mounting 11 and then passes around the gate sprocket 22 and around the drive sprocket 21. The chain continues through a stripper or guide 28 extending to a point of chain storage.

In the operation of this structure, the motor 12 is energized in such a direction as to feed out the chain 24 from the guide 28 and thus to permit the lowering of the arm 9 and of the spillway gate 8 by gravity as the gate sprocket 22 revolves around its stub shaft 23. After the gate 8 has been lowered as much as desired, it can subsequently be raised by energizing the motor 12 in the reverse sense. Then the chain 24 is taken in by clockwise rotation of the drive sprocket 21 and of the gate sprocket 22 so that the arm 9 and the attendant gate 8 are raised. The precise point occupied by the gate lip at any time is dependent upon the stopped position of the motor 12. A brake is provided on the motor and has appropriate mechanism so that the gate can very accurately be controlled as to position.

Pursuant to the invention, there is provided an indicator to show the instantaneous gate position. Connected to the shaft 19 is an indicator sprocket 31 which is engaged by a chain 32 extending to a driven indicator sprocket 33. This is installed within an indicator housing 34 suitably mounted on the mounting 11 at a convenient point for ready observation by an operator. The driven indicator sprocket 33 is mounted on a cross shaft 36 journaled in the housing 34. The sprockets 31 and 33 are preferably of the same diameter, so that the shaft 36 partakes of the motion of the drive shaft 19 in equivalent amounts. The cross shaft 36 is also provided with a sprocket 37, around which is trained an indicator chain 38 having a slack fastening 39 for one end thereof on the housing 34. The chain 38, after passing around the indicator sprocket 37, extends around a sector sprocket 41 and then at its opposite end is connected to an anchor 42 on the housing 34. The sprocket 41 is mounted on a shaft 43 supported for rotation on an indicator sector 44. The sector itself has a firm connection to a cross shaft 46 mounted in an exterior wall 47 of the housing 34 and also mounted in an intermediate wall 48 forming part of the indicator housing 34. The arrangement is such that, as the shaft 36 is revolved, the chain 38 is taken in or payed out and thus raises or lowers the sector 44, and so oscillating or rotating the cross shaft 46 with respect to the housing.

In accordance with the invention, the space relationship of the drive sprocket 21, the gate sprocket 22, the fastening means 26, and the spillway gate shaft 10, is substantially reproduced by, or is the same as, the space relationship of the indicator sprocket 37, the sector sprocket 41, the anchor 42 and the cross shaft 46.

The cross shaft 46 is provided with an indicator hand 51, fast thereon and extending alongside the obverse face of the intermediate wall 48. The indicator hand 51 has an arrow point 52 at one end which operates over the intermediate wall 48 adjacent a plurality of indicator marks 53 formed thereon to constitute a scale graduated in any convenient units to designate the particular instantaneous position not only of the indicator hand 51 but also of the spillway gate 8. Preferably, the indicator hand 51, the scale of marks 52, and the adjacent structures are protected by a glass cover 54 secured to the housing 34 by an enclosing frame 56. Thus an observer watching the indicator hand 51, particularly the arrow head 52 thereof, relative to the marks 53, can judge with sufficient accuracy for ordinary purposes the precise position of the spillway gate with respect to the dam 6.

It is preferred to afford an even more accurate and finer indication of the spillway gate position. For that reason the arcuate edge 58 of the sector 44, concentric with the axis of the shaft 46, is provided with peripheral gear teeth 59 adapted to engage with comparable teeth on a pinion 61 fast on a cross shaft 62 spanning the space between and journaled in the casing 34 and the intermediate wall 48. Also fast on the shaft 62 is a much larger intermediate gear 63 meshing with a small pinion 64 fastened on an extended cross shaft 66 mounted for rotation within the casing 34. The shaft 66 extends through the intermediate plate and carries on its outer end a fine indicator needle 67 having an arrow point 68 positioned to operate in juxtaposition with a circular indicator scale 69 marked on the obverse face of the intermediate plate 48. The shaft 66 is also preferably extended out of the housing 47 into an auxiliary casing 70 within which is disposed the sending unit (not shown) of a remote indicator which can be installed in a power house or comparable central location away from the dam spillway.

As the sector 44 oscillates with the shaft 46 and moves the hand 51, it also actuates the gear train made up of the sprocket 61 and the intermediate gear 63, as well as the pinion 64, so that the needle 67 is rotated a number of revolutions for each small increment of movement of the hand 51. Any particular ratio desired can be adopted, but it is customary to rotate the needle 67 at least once for each mark on the scale 53. This affords a very much finer or more accurate indication of the instantaneous position of the spillway gate.

In accordance with the invention, there has been provided a simple, direct mechanism which is suitable for installation adjacent a spillway gate and can readily withstand the rigors of operation in that location, yet which affords an easily legible coarse showing of the instantaneous spillway gate position, and also affords a fine indication of such position.

What is claimed is:

1. For use with a spillway gate mounted on a frame for movement about a center by means of a chain connected to a fastening on said frame then extending around a gate sprocket on said gate and trained around a drive sprocket fast on a drive shaft journaled on said frame, the combination of an indicator housing, an indicator shaft journaled in said indicator housing, an indicator hand fast on said indicator shaft and movable over indicator marks on said housing, a sector fast on said indicator shaft and having a toothed arcuate edge, a sector sprocket journaled on said sector, an indicator drive sprocket journaled on said indicator housing, an indicator chain trained around said sector sprocket and said indicator drive sprocket, means for anchoring one end of said chain to said indicator housing, an intermediate pinion meshing with the toothed arcuate edge of said sector, a gear rotatable with said pinion, means for rotatably mounting said gear and said pinion on said indicator housing, an indicator needle rotatably mounted on said housing for movement over a scale thereon, a needle pinion rotatable with said needle and meshing with said gear, and means for turning said indicator shaft and said drive shaft together.

2. A device as in claim 1 in which said sector sprocket, said indicator drive sprocket and said anchoring means bear substantially the same space relationship as do said gate sprocket, said drive sprocket and said fastening.

3. For use with a spillway gate mounted on a frame for movement about a center, the combination of an indicator housing, a sector within said housing, a cross shaft for mounting said sector for movement in said housing about the axis of said cross shaft, means for connecting said sector and said gate for equal angular movement about said axis and said center respectively, and means connected to said sector and moving therewith for indicating the position of said sector relative to said housing.

4. A device as in claim 3 in which said sector is provided with peripheral gear teeth, and said housing carries a rotary indicator connected by gears to said gear teeth.

5. A device as in claim 3 in which said indicating means is an arrow mounted on said cross shaft.

6. A device as in claim 3 in which said sector is provided with peripheral gear teeth, said housing carries a rotary indicator connected by gears to said gear teeth and said indicating means is an arrow mounted on said cross shaft.

7. An indicator device comprising an indicator housing, a sector, means for mounting said sector for rotary movement in said housing, means for displaying the rotated position of said sector relative to said housing, a drive shaft, means for mounting said drive shaft for rotation in said housing, a drive sprocket fast on said drive shaft, a sector sprocket, means for mounting said sector sprocket for rotation on said sector, a stationary anchor pin in said housing, and a sprocket chain trained over said drive sprocket and said sector sprocket and fastened to said anchor pin.

References Cited in the file of this patent
UNITED STATES PATENTS 1,208,646    Power _____ Dec. 12, 1916